US006685198B1

United States Patent
Hartman

(10) Patent No.: US 6,685,198 B1
(45) Date of Patent: Feb. 3, 2004

(54) CART

(76) Inventor: Donald Dewayne Hartman, 1298 Davis Acres Rd., Alpine, AL (US) 35014

( * ) Notice: Subject to any disclaimer, the term of this patent is extended or adjusted under 35 U.S.C. 154(b) by 48 days.

(21) Appl. No.: 10/100,410

(22) Filed: Mar. 18, 2002

(51) Int. Cl.[7] .............................................. B62B 1/00
(52) U.S. Cl. ................................... 280/1.5; 280/47.24
(58) Field of Search ............................. 280/1.5, 47.19, 280/47.24, 47.28, 47.29, 47.3, 47.315, 63, 78, 655.1

(56) References Cited

U.S. PATENT DOCUMENTS

| | | | | | |
|---|---|---|---|---|---|
| 1,312,990 | A | * | 8/1919 | Johnson | 280/1.5 |
| 1,393,876 | A | * | 10/1921 | Wright | 280/47.23 |
| 1,824,786 | A | * | 9/1931 | Nakkerud | 280/47.29 |
| 4,444,405 | A | * | 4/1984 | Barrus | 280/47.3 |
| 4,664,395 | A | * | 5/1987 | McCoy | 280/1.5 |
| 4,958,846 | A | * | 9/1990 | Greenberg | 280/652 |
| 5,044,650 | A | * | 9/1991 | Eberle, Jr. | 280/304.1 |
| 5,385,355 | A | * | 1/1995 | Hoffman | 280/1.5 |
| 6,039,333 | A | * | 3/2000 | Hamblin | 280/47.18 |
| 6,375,200 | B1 | * | 4/2002 | Harter | 280/30 |

| 2001/0007387 | A1 | * | 7/2001 | Gomez | 280/47.17 |

FOREIGN PATENT DOCUMENTS

| AT | 254710 | * | 6/1967 | 280/47.3 |
|---|---|---|---|---|
| DE | 340297 | * | 9/1921 | 280/47.3 |
| DE | 723375 | * | 8/1942 | 280/1.5 |
| DE | 122110 | * | 6/1948 | 280/47.24 |
| FR | 671765 | * | 12/1929 | 280/47.24 |

* cited by examiner

*Primary Examiner*—Frank Vanaman

(57) ABSTRACT

A cart which is capable of pulling loads over rough terrain. The cart comprises a frame composed of two side members attached together by a base platform in which at least one wheel is attached to the distal ends of the two side members. Each of the two side members are designed to form an downward bent distal end at the rearward section in which the at least one wheel is attached. Also each of the two side members have an upward bent portion at the middle section which raises the middle section to approximately the level of the shoulder height of the user. Finally each of the two side members have a downward bent portion at the forward section which is intended to fit over the user's shoulder so that the weight of the load mounted on the base platform may be partially balanced over the user's shoulders. Attached to each side members are a pair of hand grips and a pair of shoulder pads which afford the user a way of pulling the cart.

11 Claims, 3 Drawing Sheets

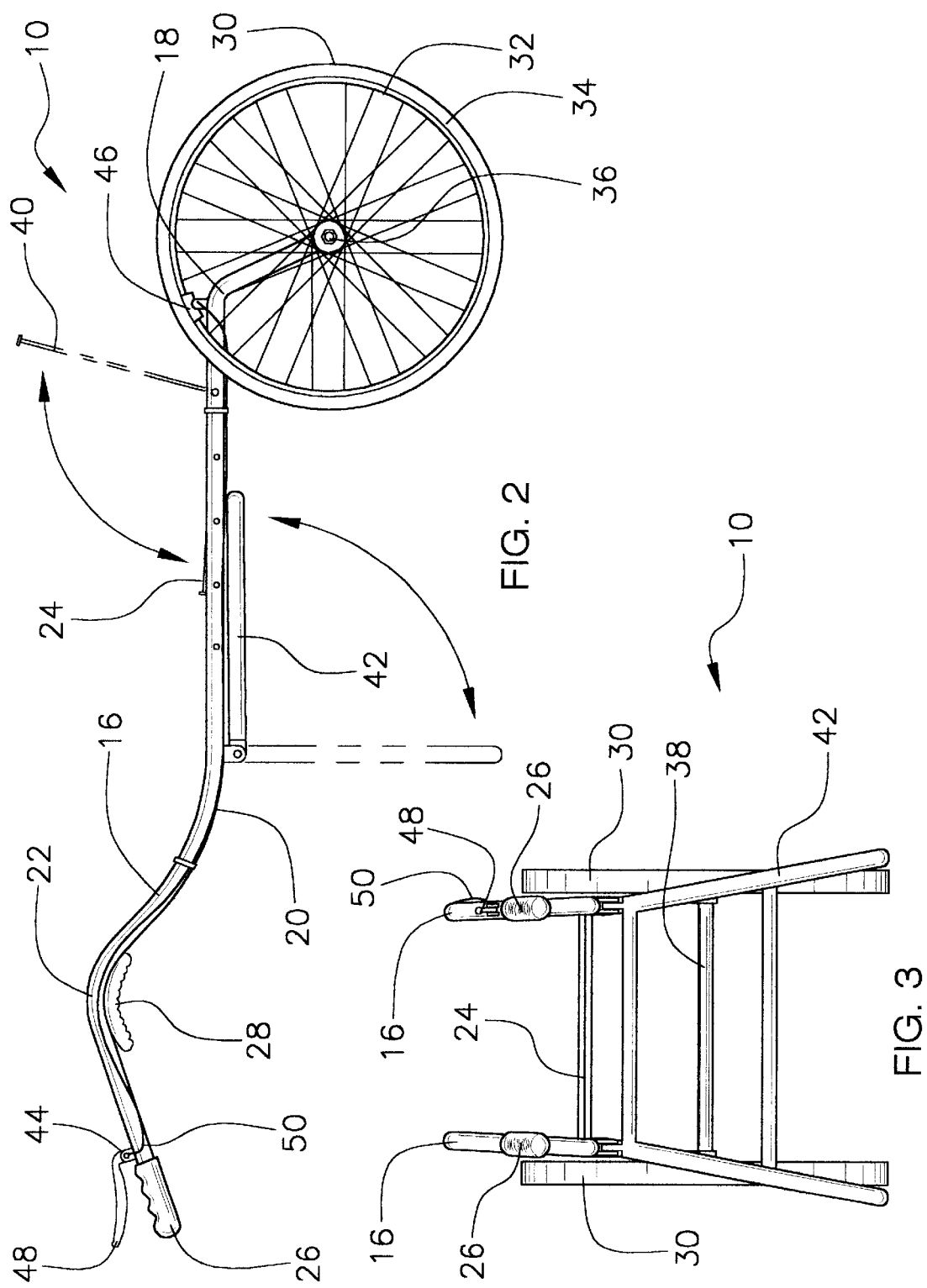

CART

FIELD OF THE INVENTION

The present invention relates to carts, and more particularly to a cart that is intended for use in hiking, camping, and the like, to facilitate the transportation of relatively heavy loads over narrow trials and over rough terrain.

DESCRIPTION OF THE PRIOR ART

The popularity of hiking and camping and the availability of backpacks for enhancing the comfort of trips into the mountains and other recreational areas emphasize the problems of transporting supplies into remote rugged areas over narrow trails and rough terrains. The common practice is to carry all such supplies in backpacks, and those backpacks have been improved to the extent that they support larger loads and are organized to carry the essentials for camping. However, the weight of the supplies supported by the hikers remains burdensome and significantly constitutes a restriction on the distances that a user may be able to travel with a given load in a given period of time.

The rough terrain cart disclosed by Barrus in U.S. Pat. No. 4,444,405 discloses a cart for one one or two hikers having a double elongated aluminum tubular frame with two pairs of handles for allowing one or two hikers to transport their backpacks by pushing and pulling the device. The cart described by Crossman and McLaughlin in U.S. Pat. No. 363,585, and the cart described by Curran and disclosed in U.S. Pat. No. 3,820,807 all share many similar features disclosed by Barrus and would consequently suffer many of the same disadvantages when using the device. The Barrus disclosure suffers the same disadvantage described in the Smith device in that it is silent with regards to shoulder pads and as a result of using the Barrus device, the users must push or pull the load with their hands. As a consequence, the use of the Barrus device is likely to cause the users to develop hand and arm muscle sprains. Furthermore, because control is exclusively associated with the use of the hands, the Barrus device may also produce carpal tunnel syndrome at the hands, wrist and elbows. Even further, because the Barrus device employs only handgrips, then use of the Barrus device over rough terrain is likely to cause back sprains brought about by the requisite back bending in using the Barrus device.

The one man carrier and back pack described by Wilkerson et al in U.S. Pat No. 5,820,141 discloses a collapsible carrier having an inflatable roller assembly for transporting loads over rough terrain by providing a pair of handles for either pushing or pulling the loaded cart. Use of the the Wilkerson device would likely result in many of the above mentioned disadvantages, such as developing hand, wrist, and arm muscle strain as well as possibly causing or aggravating carpal tunnel syndrome.

The combined wheel and pack carrier described by Tracy et al in U.S. Pat. No. 3,560,015 discloses a wheelbarrow device for moving a load attached to the device. The Tracy device may be readily detachably secured to the back of a user for pack carrying. The Tracy device is silent with regards to shoulder pads which allow the user to pull the device, and as a consequence the Tracy device suffers from many of the above mentioned disadvantages. Furthermore, if the Tracy device is used as a pulling device, the user would likely not be able to easily control the device because the Tracy device would be entirely behind the user.

While all of the above-described devices fulfill their respective, particular objectives and requirements, the aforementioned patents do not describe a bent portion in the cart frame which can be used to place a portion of the load burden on to the shoulders of the users. Nor do any of the aforementioned patents explicitly suggest or implicitly suggest the a cart having shoulder pads which allow the user to comfortably engage the cart so that the user can pull the cart in an upright position. Furthermore, non of the aforementioned patents suggest or imply a downward bent portion in the front section of the frame which can accommodate the user's shoulders while pulling the cart.

Therefore, a need exists for a new and improved cart that can be used for pulling a cart while engaging a user's shoulders with the cart so that the user may be able to comfortably transport loads attached to the cart. In this respect, the cart according to the present invention substantially departs from the conventional concepts and designs of the prior art, and in doing so provides an apparatus primarily developed for the purpose of allowing a user to control a cart by pulling the cart while engaging a portion of the cart over the user's shoulders and having handgrips in front of the user.

SUMMARY OF THE INVENTION

In accordance with this invention a cart that is capable of pulling loads over rough terrain is described. The cart comprises a frame composed of two side members attached together by a a base platform in which at least one wheel is attached to the distal ends of the two side members. Each of the two side members are designed to form an downward bent distal end at the rearward section in which the at least one wheel is attached. Also each of the two side members have an upward bent portion at the middle section which raises the middle section to approximately the level of the shoulder height of the user. Finally each of the two side members have a downward S bent portion at the forward section which is intended to fit over the user's shoulder so that the weight of the load mounted on the base platform may be partially balanced over the user's shoulders. Attached to each side members are a pair of hand grips and a pair of shoulder pads which afford the user a means of pulling the cart.

In view of the foregoing disadvantages inherent in the known type carts now present in the prior art, the present invention provides an improved cart, which will be described subsequently in great detail, is to provide a new and improved cart which is not anticipated, rendered obvious, suggested, or even implied by the prior art, either alone or in any combination thereof.

To attain this, the present invention essentially comprises a cart which comprises a frame composed of two side members attached together by a base platform in which at least one wheel is attached to the distal ends of the two side members. Each of the two side members are designed to form an downward bent distal end at the rearward section in which the at least one wheel is attached. Also each of the two side members have an upward bent portion at the middle section which raises the middle section to approximately the level of the shoulder height of the user. Finally each of the two side members have a downward bent portion at the forward section which is intended to fit over the user's shoulder so that the weight of the load mounted on the base platform may be partially balanced over the user's shoulders.

There has thus been outlined, rather broadly, the more important features of the invention in order that the detailed description thereof that follows may be better understood, and in order that the present contribution of the art may be better appreciated.

The invention may also include a kickstand, a brake system, a back rest, a speedometer and an odometer. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cart that has all the advantages of the prior art cart and none of the disadvantages.

It is another object of the present invention to provide a new and improved cart that may be easily and efficiently manufactured and marketed.

An even further object of the present invention is to provide a new and improved cart that has a low cost of manufacture with regard to both materials and labor, and which accordingly is then susceptible of low prices of sale to the consuming public, thereby making such multipurpose storage unit and system economically available to the buying public.

Still another object of the present invention is to provide a new cart that provides in the apparatuses and methods of the prior art some of the advantages thereof, while simultaneously overcoming some of the disadvantages normally associated therewith.

Even still another object of the present invention is to provide a cart for allowing a user to distribute a portion of the burden of a load onto the user's shoulders. This makes it possible to allow a user to transport loads in a comfortable manner in which the user is able to shift the burden of pulling the load onto the user's shoulders.

Yet another object of the present invention is to provide a cart with shoulder pads. This makes it possible to afford a user a comfortable means of bearing the burden of pulling the load over the user's shoulders.

Another object of the present invention is to provide a cart with shoulder pads that can be used to place a portion of the burden of a load onto the user's shoulder. This makes it possible for the user to employ the user's shoulders and upper torso while pulling the cart. Thereby allowing the user to develop and increase and enhance the user's upper torso body strength.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the cart of the present invention;

FIG. 3 is a frontal view of the cart of the present invention; and

The same reference numerals refer to the same parts throughout the various figures.

DETAILED DESCRIPTION OF THE PREFERRED EMBODIMENT

Figure 1:
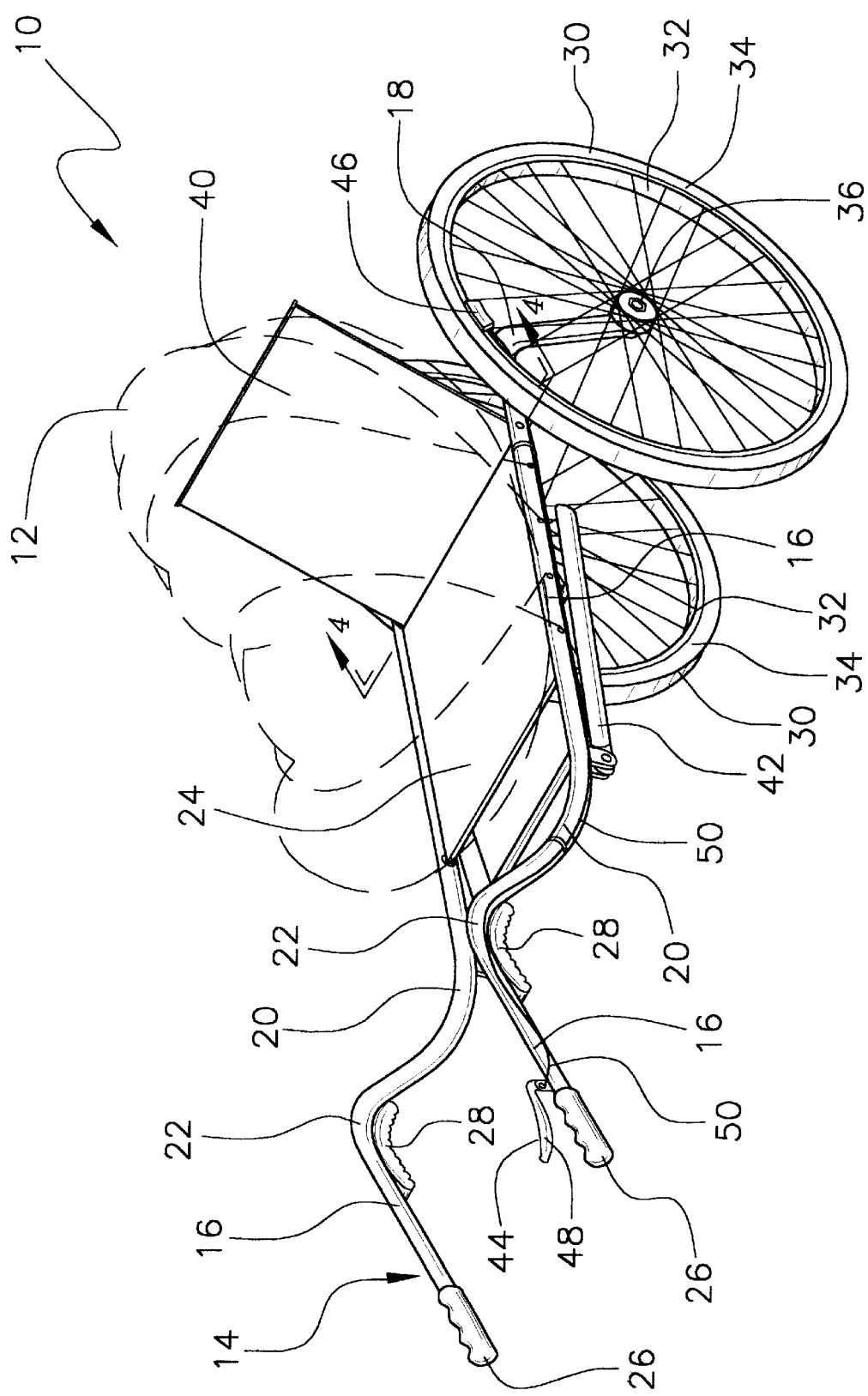
FIG. 1 is a perspective view of the preferred embodiment of the cart constructed in accordance with the principles of the present invention.

Referring now to the drawings, and in particular FIGS. 1 to 4 thereof, one preferred embodiment of the present invention is shown and generally designated by the reference numeral 10. The present invention of the cart 10 comprises a frame 14 having: a left and right side member 16, each side member 16 having a middle section, a forward section, and a rearward section. Each of the side members 16 of the frame 14 having: a downward bent distal end portion 18 at the rearward section; an upward bent portion 20 at the middle section; and a downward bent portion 22 at the forward section. The frame 14 also has a base platform 24 for securing the load 12 onto the cart 10, in which the base platform 24 is attached to each of the side members 16. Furthermore, each of the side members 16 of the frame 14 are attached to a corresponding opposing side of the base platform 24, respectively. The base platform 24 is attached between the left and right side members 16 and attached at the rearward sections of each of the side members 16. The frame 14 also has a pair of handle grips 26. Each handle grip 26 is separately attached to the proximate end at the forward section of the corresponding side member 16, respectively. The frame 14 also has a pair of shoulder pads 28. Each shoulder pad 28 is separately attached to the forward section of the corresponding side member 16, respectively. The shoulder pads 28 are for engaging the upper torso shoulder area of the user when the user pulls the cart 10. Finally, the cart 10 includes at least one ground-engaging wheel 30. The wheel 30 includes a rim 32, a tire 34 and an axle 36. The axle 36 of the wheel 30 is connected to the distal end of the rearward section of both the left and right side members 16 of the frame 14 in which the frame 14 encloses the wheel 30 about its axle 36 and provides mounting for the wheel 30.

The cart 10 may optionally comprise a second ground-engaging wheel 30 having a second rim 32, a second tire 34 and a second axle 36; and having a connecting rod 38 connecting the two wheels 30 together along their axles 36. The optional connecting rod 38 is attached to the distal ends of the rearward sections of the left and right side members 16 of the frame 14.

The cart 10 may optionally comprise an odometer (not shown) attached to the wheel 30 for estimating the distance traveled by the cart 10. The cart may also optionally comprise a speedometer (not shown) attached to the wheel 30 for estimating the speed traveled by the cart 10.

To increase the area the area for securing the load 12 onto the cart 10, the cart 10 may optionally comprise a back stand 40. The back stand 40 may be pivotally hinged to the base platform 24 or may be pivotally hinged to the left and right side members 16 behind the base platform 24. When the back stand 40 is pivotally hinged away from the base platform 24 the surface area available on the cart 10 to secure a load 12 is increased. In addition, an optional brace may be pivotally connected to the base platform 24 or pivotally connected to at least one of the side members 16 so that the brace may support the back stand 40 when the back stand 40 is pivotally hinged away from the base platform 24. Furthermore, the optional brace may further comprises a means for locking the back stand 40 at a plurality of angles relative to the base platform 24 when the back stand 40 is pivotally hinged away from the base platform 24. This means for locking the back stand may be any conventional locking means such as a telescoping rod with a screw for locking the telescoping rod.

To provide a further means for securing the load 12 onto the cart 10, the cart 10 may also optionally be equipped with a left and right side wall attached to the rearward section of the corresponding left and right side member 16.

To providing a means for maintaining or stabilizing the cart 10 in a stand alone position when the user is not contacting the shoulder pads 28 or the cart 10 itself, the cart 10 may also optionally comprise a kick stand 42 pivotally attached to both the left and right side members 16 along the corresponding middle sections of the left and right side members 16. This optional kick stand 42 is for providing a means for maintaining the cart 10 in a stand alone position, when the kick stand 42 is pivoted away from the frame 14.

To provide a means for controlling the cart 10 while the user is pulling the cart 10 down hill, the cart 10 may also optionally comprise a braking system 44 having: a brake pad 46 attached to the frame 14 and engageable with said wheel 30; a brake handle 48 attached to one of the handle grips 26; and a cable 50 connected to said brake pad 46 and to said brake handle 48 in which a user is able to control the engagement of said brake pad 46 to said wheel 30 by squeezing on said brake handle 48 against said hand grip 26.

To provide a means for custom fitting the height of the cart 10 to particular shoulder height of the user, the cart 10 may also optionally comprise a height adjustment means for extending the height of the frame 14 to custom fit the particular height of the user's shoulders. The height adjustment means may be any commercially available means of extending abutting conduits. One embodiment of the optional height adjustment means for extending the height of the frame 14 is a telescoping conduit system where one conduit fits within another conduit and both of the conduits having a plurality of matching holes in which a user may place a cotter pin or a bolt to secure the telescoping conduit at the desired length. Another embodiment of the height adjustment means for extending the height of the frame 14 is a separate extending rod used to abut to adjoining conduits so as to extend the overall length of the member.

To provide a way of storing the cart 10 in a compact manner and a way of more easily and conveniently transporting the cart 10, the cart 10 may also optionally be collapsible into a folded state for compact storage and more convenient transportation.

To provide a minimum weight to the cart 10, the left and right side members 16 of the cart 10 may optionally be made of any number of commercially available materials. One preferred optional embodiment of the side members 16 is that they are made of lightweight hollow conduit tubing.

The base platform 24 of the cart 10 may optionally be substantially flat and has a general rectangular shape. An alternate embodiment of the base platform 24 of the cart 10 may optionally have a generally rectangular shape and have a concave surface in the middle of the base platform 24 for convenient storage of the load. An optional belt attached to the frame 14 for securing the load 12 onto the cart 10 may also be included.

To provide an upper torso fit over the user, the downward bent portions 22 of the forward sections of the left and right side members 16 of the cart 10 may optionally be formed in an upside down U-shape for fitting over the shoulders of the user when the user pulls the cart 10.

The cart 10 may optionally be designed from materials so that the cart 10 may be capable of allowing the user to pull a two hundred pound load secured to the cart 10.

FIG. 1 is a perspective view of one of the two wheeled embodiments of the new and improved cart unit 10 of the present invention. This embodiment of the cart 10 comprises a frame 14 having a left and right side member 16, each side member 16 having a middle section, a forward section, and a rearward section, each side member 16 having: a downward bent distal end portion 18 at the rearward section; an upward bent portion 20 at the middle section having a height adjustment means for extending the height of the frame 14 to custom fit the particular height of the user's shoulders; and a downward bent portion 22 at the forward section formed in an upside down U-shape for fitting over the shoulders of the user when the user pulls the cart 10. This embodiment of the cart 10 also has a base platform 24 for securing the load 12 onto the cart 10, the base platform 24 attached to each of the side members 16, each of the side members 16 is attached to a corresponding opposing side of the base platform 24, respectively, in which, the base platform 24 is attached between the left and right side members 16 and attached at the rearward sections of each of the side members 16. Pivotally hinged to the base platform 24 is a back stand 40 for increasing the area for securing the load 12 onto the cart 10 when the back stand 40 is pivotally hinged away from the base platform 24. A brace (not shown) is pivotally connected to the base platform 24 and to the back stand 40 for supporting the back stand 40 when the back stand 40 is pivotally hinged away from the base platform 24 which has a means for locking the back stand 40 at a plurality of angles relative to the base platform 24 when the back stand 40 is pivotally hinged away from the base platform 24. A left and right side wall attached to the rearward section of the corresponding left and right side member 16, the left and right side walls for providing a further means for securing the load 12 onto the cart 10. A kick stand 42 pivotally attached to both the left and right side members 16 along the corresponding middle sections of the left and right side members 16. The kick stand 42 for providing a means for maintaining the cart 10 in a stand alone position, when the kick stand 42 is pivoted away from the frame 14. A pair of handle grips 26, in which each handle grip 26 is separately attached to the proximate end at the forward section of the corresponding side member 16, respectively. The handle grips 26 adapted to be grasped by the hands of the user. A pair of shoulder pads 28, in which each shoulder pad 28 is separately attached to the forward section of the corresponding side member 16, respectively, the shoulder pads 28 for engaging the upper torso shoulder area of the user when the user pulls the cart 10. A first ground-engaging wheel 30 having a first rim 32, a first tire 34, and a first axle 36. The first axle 36 of said first wheel 30 is pivotally attached to the downward bent distal end of the rearward section of said left side member 16. A second ground-engaging wheel 30 having a second rim 32, a second tire 34 and a second axle 36. The second axle 36 of said second wheel pivotally attached to the downward bent distal end of the rearward section of said right side member 16. A braking system 44 comprising: a brake pad 46 attached to the frame and engageable to one of the wheels 30; a brake handle 48 attached to one of the handle grips 26; and a cable 50 connected to the brake pad 46 and to the brake handle 48. The cable 50 connected to the brake pad 46 and to the brake handle 48 is for allowing a user to engage the brake pad 46 to the wheel by squeezing the brake handle 48 against the handle grip 26. An odometer (not shown) attached to one of the wheel 30 for estimating the distance traveled by the cart 10. Finally this alternate embodiment of the cart 10 comprises a speedometer (not shown) attached to one of the wheel 30 for estimating the speed traveled by the cart 10.

FIG. 2 is a side view of a two wheeled embodiment of the present invention of the cart 10. The left side member 16 of the frame 14 is shown having a downward bent distal end portion 18 at the rearward section; an upward bent portion 20 at the middle section of the frame 14 to reach over the user's shoulders; and a downward bent portion 22 at the forward section may be formed in an upside down U-shape for fitting over the shoulders of the user when the user pulls the cart 10. Shown in FIG. 2 the shoulder pads may be attached directly below the below the downward bent portion 22 at the forward section of the side members 16. Each shoulder pad 28 is separately attached to the forward section of the corresponding side member 16, respectively, the shoulder pads 28 for engaging the upper torso shoulder area of the user when the user pulls the cart 10. Connecting the left and right side members 16 together is the base platform 24 which also secures the load 12 onto the cart 10. Pivotally hinged to the left and right side members 16 behind the base platform 24 is a back stand 40 for increasing the area for securing the load 12 onto the cart 10 when the back stand 40 is pivotally hinged away from the base platform 24. Pivotally connected to the left and right side members 16 is a kick stand 42. As shown in FIG. 2, the kick stand 42 may be pivoted towards the left and right side members 16 in a position that allows the kick stand 42 to be out of the way of the user's feet while the user pulls the kick stand 42. Also shown in FIG. 2, the kick stand 42 provides a means for maintaining the cart 10 in a stand alone position, when the kick stand 42 is pivoted away from the frame 14. A pair of handle grips 26, in which each handle grip 26 is separately attached to the proximate end at the forward section of the corresponding side member 16, respectively. The handle grips 26 are adapted to be grasped by the hands of the user. Shown in FIG. 2 is a first ground-engaging wheel 30 having a first rim 32, a first tire 34, and a first axle 36. The first axle 36 of said first wheel 30 is pivotally attached to the downward bent distal end of the rearward section of said left side member 16. FIG. 2 also shows a braking system 44 comprising: a brake pad 46 attached to the frame and engageable to one of the wheels 30; a brake handle 48 attached to one of the handle grips 26; and a cable 50 connected to the brake pad 46 and to the brake handle 48. The cable 50 connected to the brake pad 46 and to the brake handle 48 is for allowing a user to engage the brake pad 46 to the wheel by squeezing the brake handle 48 against the handle grip 26.

FIG. 3 shows a frontal view of one of the two wheeled embodiments of the present invention of the cart 10. Shown in FIG. 3, the kick stand 42 may be pivoted downwards and away from the left and right side members 16 in a position that allows the kick stand 42 provide a means for maintaining the cart 10 in a stand alone position. The kick stand 42 may also be pivoted upwards towards the left and right side members 16 in a position that allows the kick stand 42 to be out of the way of the user's feet while the user pulls the kick stand 42.

Figure 4:
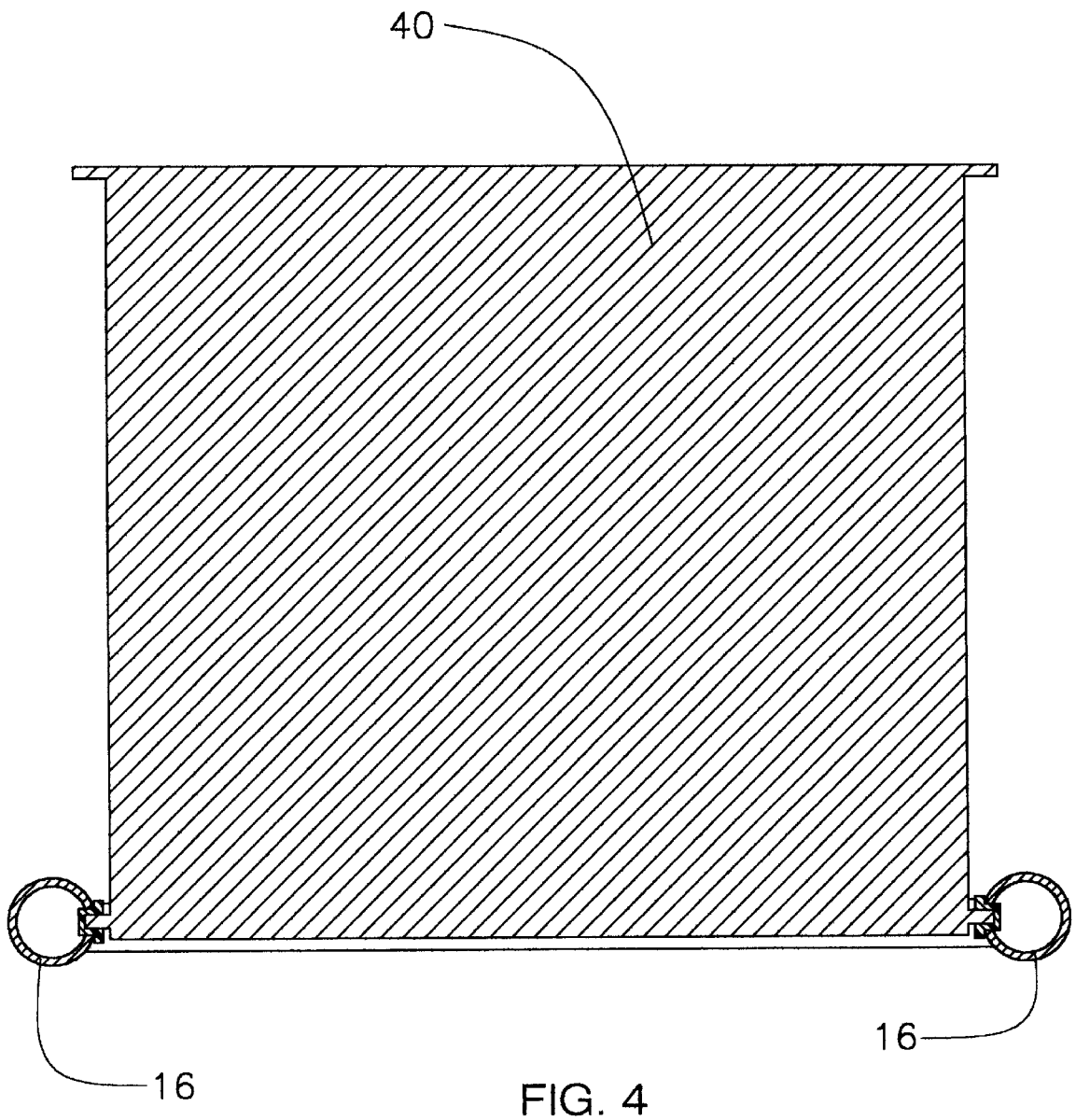
FIG. 4 is a cross sectional view of the cart showing the optional back stand of the present invention.

FIG. 4 shows cross sectional view of the cart showing the optional back stand 40 of the present invention of the cart 10. Pivotally hinged to the left and right side members 16 behind the base platform 24 is a back stand 40 for increasing the area for securing the load 12 onto the cart 10 when the back stand 40 is pivotally hinged away from the base platform 24. The back stand 40 may alternatively be pivotally hinged to the is base platform 24 in which it again is for increasing the area for securing the load 12 onto the cart 10 when the back stand 40 is pivotally hinged away from the base platform 24.

As to the manner of usage and operation of the present invention, the same should be apparent from the above description. Accordingly, no further discussion relating to the manner of usage and operation will be provided.

While a preferred embodiment of the cart has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any sturdy material such as metal, plastic, cardboard, or a variety of wood may be used. Also, the side members may also be hollow conduit tubing as long as they provide sufficient strength to support loads of up to two hundred pounds to be pulled.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cart for allowing a user to pull a load over rough terrain by allowing the user to exert a pulling force onto said cart by engaging the user's shoulders to said cart, said cart comprising:
   a frame having
      a left and right side member, each side member having a middle section, a forward section, and a rearward section, each side member having:
         a downward bent distal end portion at the rearward section;
         an upward bent portion at the middle section; and
         a downward bent portion at the forward section;
      a base platform for securing the load onto said cart, said base platform is attached to each of said side members, each of said side members is attached to a corresponding opposing side of said base platform, respectively, wherein said base platform is attached between said left and right side members and attached at the rearward sections of each of said side members;
      a pair of handle grips, each handle grip is separately attached to a proximate end at the forward section of the corresponding side member, respectively;
      a pair of shoulder pads, each shoulder pad is separately attached to the forward section of the corresponding side member, respectively, said shoulder pads for engaging the upper torso shoulder area of the user when the user pulls said cart; and
      at least one ground-engaging wheel, said wheel having a rim, a tire and an axle, said axle connected to the distal end of the rearward section, wherein said frame encloses said wheel about its axle and provides mounting for said wheel.

2. The cart described in claim 1 further comprising:
   a second ground-engaging wheel having a second rim, a second tire and a second axle.

3. The cart described in claim 1 further comprising a kick stand pivotally attached to both the left and right side members along the corresponding middle sections of the left and right side members, said kick stand for providing a means for maintaining said cart in a stand alone position, when said kick stand is pivoted away from said frame.

4. The cart described in claim 1 further comprising a braking system having:
   a brake pad attached to said frame and engageable to said wheel;
   a brake handle attached to one of said handle grips; and
   a cable connected to said brake pad and to said brake handle, wherein allowing a user to control the engagement of said brake pad to said wheel by squeezing on said brake handle against said hand grip.

5. The cart described in claim 1 wherein said base platform is substantially flat and has a general rectangular shape.

6. The cart described in claim 1 wherein said base platform has a generally rectangular shape and has a concave surface in the middle of said base platform for convenient storage of the load.

7. The cart described in claim 1 wherein the downward bent portions of the forward sections of said left and right side members are formed in an upside down U-shape for fitting over the shoulders of the user when the user pulls said cart.

8. The cart described in claim 1 further comprising:
   a back stand pivotally hinged to said left and right side members behind said base platform.

9. A cart for allowing a user to pull a load over rough terrain by allowing the user to exert a pulling force onto said cart by engaging the user's shoulders to said cart, said cart comprising:
   a frame having
      a left and right side member, each side member having a middle section, a forward section, and a rearward section, each side member having:
         a downward bent distal end portion at the rearward section;
         an upward bent portion at the middle section having a height adjustment means for extending the height of the frame to custom fit the particular height of the user's shoulders; and
         a downward bent portion at the forward section;
      a base platform for securing the load onto said cart, said base platform is attached to each of said side members, each of said side members is attached to a corresponding opposing side of said base platform, respectively, wherein said base platform is attached between said left and right side members and attached at the rearward sections of each of said side members;
      a pair of handle grips, each handle grip is separately attached to a proximate end at the forward section of the corresponding side member, respectively, said handle grips adapted to be grasped by the hands of the user;
      a pair of shoulder pads, each shoulder pad is separately attached to the forward section of the corresponding side member, respectively, said shoulder pads for engaging the upper torso shoulder area of the user when the user pulls said cart;
      a kick stand pivotally attached to both the left and right side members along the corresponding middle sections of the left and right side members, said kick stand for providing a means for maintaining said cart in a stand alone position, when said kick stand is pivoted away from said frame;
      a first ground-engaging wheel having a first rim, a first tire and a first axle, said axle of said first wheel pivotally attached to the downward bent distal end of the rearward section of said left side member; and
      a second ground-engaging wheel having a second rim, a second tire and a second axle, said axle of said second wheel pivotally attached to the downward bent distal end of the rearward section of said right side member.

10. The cart described in claim 9 further comprising
    a back stand pivotally hinged to said left and right side members behind said base platform.

11. A cart for allowing a user to pull a load over rough terrain by allowing the user to exert a pulling force onto said cart by engaging the user's shoulders to said cart, said cart comprising:
    a frame having
       a left and right side member, each side member having a middle section, a forward section, and a rearward section, each side member having:
          a downward bent distal end portion at the rearward section;

an upward bent portion at the middle section having a height adjustment means for extending the height of the frame to custom fit the particular height of the user's shoulders; and a downward bent portion at the forward section formed in an upside down U-shape for fitting over the shoulders of the user when the user pulls said cart;

a base platform for securing the load onto said cart, said base platform is attached to each of said side members, each of said side members is attached to a corresponding opposing side of said base platform, respectively, wherein said base platform is attached between said left and right side members and attached at the rearward sections of each of said side members;

a back stand pivotally hinged to said base platform;

a kick stand pivotally attached to both the left and right side members along the corresponding middle sections of the left and right side members, said kick stand for providing a means for maintaining said cart in a stand alone position, when said kick stand is pivoted away from said frame;

a pair of handle grips, each handle grip is separately attached to a proximate end at the forward section of the corresponding side member, respectively, said handle grips adapted to be grasped by the hands of the user;

a pair of shoulder pads, each shoulder pad is separately attached to the forward section of the corresponding side member, respectively, said shoulder pads for engaging the upper torso shoulder area of the user when the user pulls said cart;

a first ground-engaging wheel having a first rim, a first tire and a first axle, said first axle of said first wheel pivotally attached to the downward bent distal end of the rearward section of said left side member; and a second ground-engaging wheel having a second rim, a second tire and a second axle, said second axle of said second wheel pivotally attached to the downward bent distal end of the rearward section of said right side member; and a braking system comprising:

a brake pad attached to said frame and engageable to one of said wheels;

a brake handle attached to one of said handle grips; and a cable connected to said brake pad and to said brake handle, wherein allowing a user to control the engagement of said brake pad to said wheel by squeezing on said brake handle against said hand grip.

* * * * *